Figure 1:
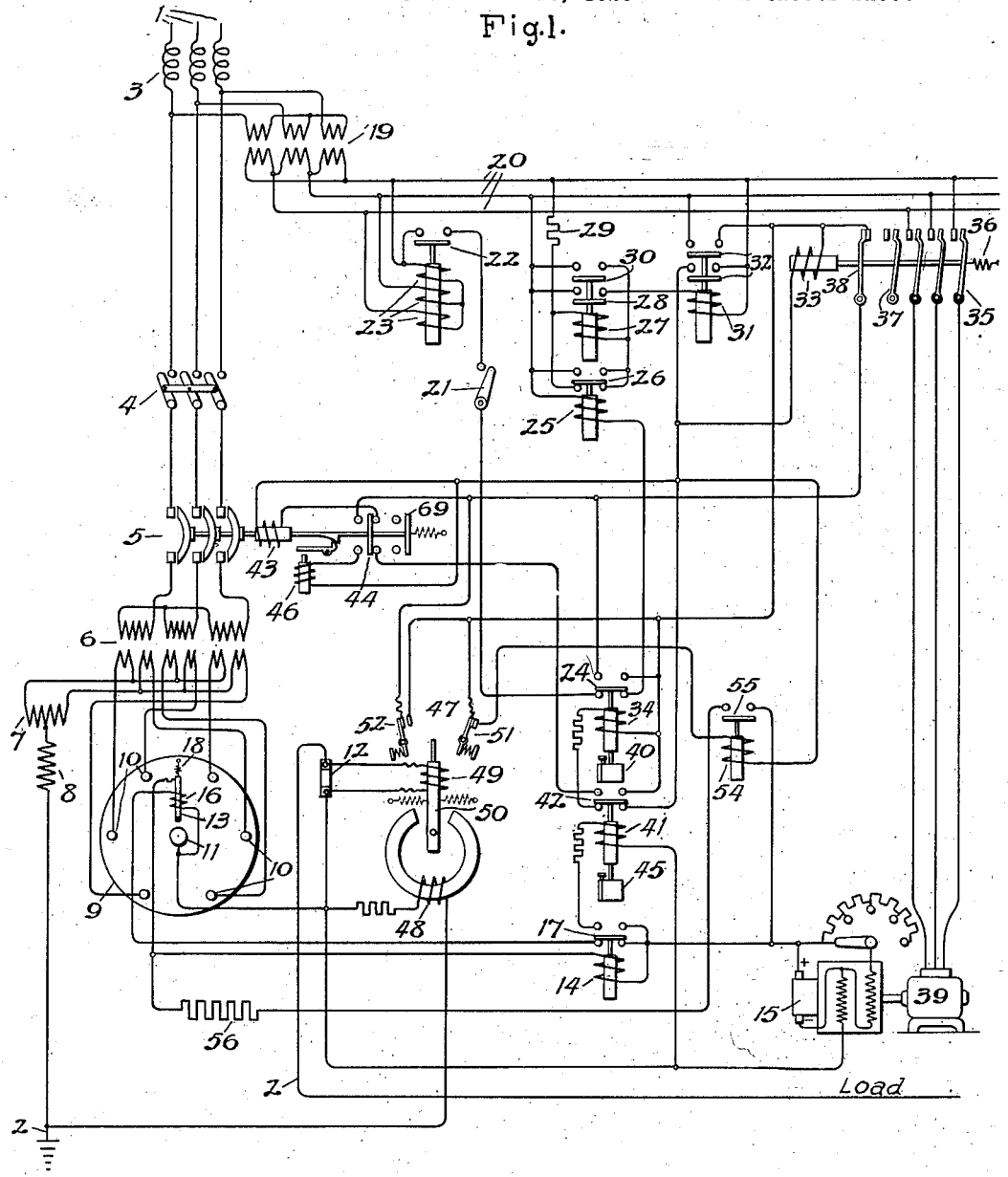

Feb. 5, 1929.

E. L. HOUGH 1,701,369

CONTROL OF ELECTRIC POWER

Filed Oct. 16, 1926 2 Sheets-Sheet 1

Inventor:
Eugene L. Hough,
by
His Attorney.

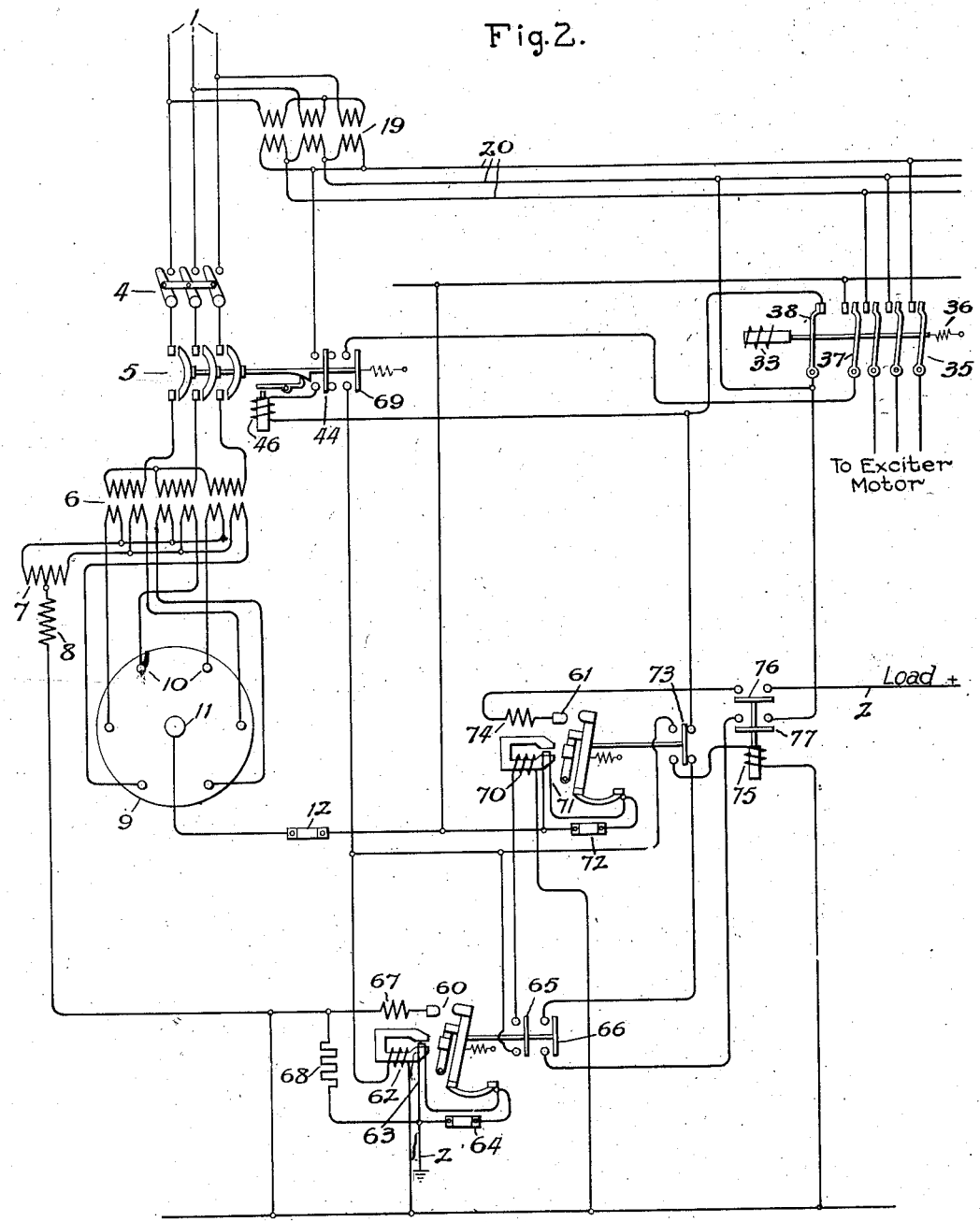

Patented Feb. 5, 1929.

1,701,369

UNITED STATES PATENT OFFICE.

EUGENE L. HOUGH, OF SCHENECTADY, NEW YORK, ASSIGNOR TO GENERAL ELECTRIC COMPANY, A CORPORATION OF NEW YORK.

CONTROL OF ELECTRIC POWER.

Application filed October 16, 1926. Serial No. 142,103.

My invention relates to the control of electric power and has for its principal object the provision of an improved apparatus for controlling the operation of a vapor electric device such as a mercury arc rectifier utilized to transmit power between alternating and direct current circuits.

Various apparatus have been provided in the past for controlling the operation of a mercury rectifier arranged to transmit power between alternating and direct current circuits. Such apparatus have not been altogether satisfactory because they permit operation of the rectifier when the alternating current circuit is badly unbalanced, do not control the excitation of the rectifier in the most effective manner, or do not afford the proper protection against excess and reverse currents in the direct current circuits. In accordance with my invention, these and other difficulties are avoided by the provision of an apparatus which affords protection against single phase operation of the rectifier and is so connected to the alternating and direct current circuits that current is supplied to the rectifier only when the exciting arc is promptly started and the current of the direct current circuit is not excessive and is in the proper direction.

My invention will be better understood from the following description when considered in connection with the accompanying drawings and its scope will be pointed out in the appended claims.

Referring to the drawings, Figs. 1 and 2 show a power control apparatus wherein my invention has been embodied. Part of this apparatus is shown by Fig. 1 and part of it is shown by Fig. 2.

The part shown by Fig. 1 comprises an alternating current circuit 1 and a direct current circuit 2 which are arranged to be interconnected through means comprising reactors 3, switches 4 and 5, a main transformer 6, an interphase transformer 7, a smoothing reactor 8 and a mercury arc rectifier 9. The rectifier 9 comprises a plurality of anodes 10 which are connected to the secondary terminals of the transformer 6, a cathode 11 which is connected to one side of the direct current circuit 2 through a shunt 12, and a starting and exciting anode 13 which is connected to the cathode 11 through a circuit comprising a relay switch operating coil 14 and a source of excitation shown as a direct current generator 15. Operation of the anode 13 to start an arc within the rectifier 9 is effected by an operating coil 16 which is connected to the generator 15 through a relay switch 17 and is arranged to move the anode 13 against the tension of a spring 18 into contact with the mercury cathode 11.

A plurality of switches are provided for controlling the operation of the main control switch 5 and the exciting generator 15 in a manner to ensure proper operation of the rectifier 9. Current for operating certain of these switches is supplied from the alternating current circuit 1 through a transformer 19 and a control bus 20. The operation of these relay switches is initiated by closure of a switch 21 which may be operated in response to predetermined changes in the voltage of the direct current circuit 2 or in any other desired manner. If one phase of the circuit 1 is deenergized or if the voltages of the circuit 1 are badly unbalanced, however, operation of the switches supplied with current through the bus 20 is prevented by a relay switch 22 which is provided with polyphase operating coil 23 and is closed only if all these coils are energized.

When the switches 21 and 22 are closed, current is supplied through these switches and a switch 24 to the operating coil 25 of a switch 26 which is operated to its upper closed position thereby connecting the operating coil 27 of a switch 28 to the bus 20 through a resistor 29. The switch 28 is provided with an auxiliary contact member 30 which completes a holding circuit in parallel with the circuit completed by the switch 26 in its upper closed position.

Closure of the switch 28 completes a circuit whereby the operating coil 31 of a switch 32 is connected to the bus 20 thus operating the switch 32 to its closed position and energizing the operating coils 33 and 34 of the switches 35 and 24 respectively. The switch 35 which is biased to its open position by a spring 36 and is provided with auxiliary contact members 37 and 38, is immediately closed upon energization of its operating coil 33, thereby energizing a motor 39 which drives the exciting generator 15. The switch 24 is provided with a timing element 40 which delays its closure long enough to permit starting of the exciting arc of the rectifier under normal conditions.

When the motor 39 starts, current is supplied from the exciting generator 15 through the switch 17 to the coil 16 of the starting anode 13, the anode 13 is caused to engage the cathode 11 and complete a circuit through the operating coil 14, the switch 17 is operated to its upper closed position, the anode operating coil 16 is deenergized, and an arc is struck between the starting anode and the cathode. If the exciting arc of the rectifier were not started, the switch 34 would open and the motor 39 would be disconnected from the bus 20 due to opening of the switches 28, 32 and 35.

In its upper closed position, the switch 17 completes a circuit through which the operating coil 41 of a switch 42 is connected to the generator 15. It will be observed that the switch 42 in its lower closed position completes a circuit between the bus 20 and the operating coil 34 of the switch 24 and in its upper closed position completes a circuit from the bus 20 through an interlock switch 44 to the closing coil 43 of the main switch 15 which is closed immediately after operation of the switch 42 to its upper closed position.

As previously indicated, the function of the switch 24 is to deenergize the generator 15 and prevent closure of the main switch 5 in case the exciting arc of the rectifier is not started within a time interval determined by the adjustment of the timing element 40. The switch 42 is provided with a timing element 45 which produces a predetermined time interval between starting of the exciting arc and closure of the main switch 5. The auxiliary contact member 38 of the switch 35 is so arranged as to complete a circuit from the bus 20 through the auxiliary contact 44 of the switch 5 to the trip coil 46 of this switch when it is closed and the switch 35 is operated to its open position.

A polarized relay 47, comprising a stationary coil 48 connected to the rectifier in shunt to the direct current circuit 2 and a movable coil 49 connected to the series shunt 12, is provided with a movable member 50 which is biased to its illustrated position and is arranged to open a switch 51 when moved to the right and to close a switch 52 when moved to the left. So long as the current of the direct current circuit 2 is of normal value and in the right direction, the switch 51 is maintained open by the member 50 thus interrupting the connection between the bus 20 and the operating coil 54 of a switch 55 which is arranged to connect a resistor 56 in shunt to the operating coil 14 and increase the excitation of the rectifier 9 when the load of the direct current circuit 2 is light and the member 50 does not maintain the switch 51 in its open position. If the current of the direct current circuit 2 tends to reverse, the member 50 is moved into engagement with the switch 52 which connects the main switch trip coil 46 to the bus 20 and causes the rectifier to be disconnected from the alternating current circuit 1.

In order to facilitate an understanding of the invention, the remainder of the control equipment has been shown in Fig. 2. This part of the control equipment comprises a high speed, over-current circuit breaker 60 and a high speed, reverse current circuit breaker 61. These breakers are of a type disclosed by reissue Letters Patent of J. F. Tritle, No. 15,441, August 29, 1922, and their construction and operation will be readily understood without detailed explanation.

The breaker 60 is provided with a shunt coil 62 which is connected to the rectifier 9 in shunt to the direct current circuit 2, with a series coil 63 connected in the direct current circuit in parallel with an inductive shunt 64, with auxiliary contact members 65 and 66, with a reactor 67 and with a resistor 68. The connection of the shunt coil 62 to the direct current circuit 2 is completed through an auxiliary contact member 69 of the switch 5 and the auxiliary contact member 37 of the switch 35. Closure of the breaker may be effected in any suitable manner.

The breaker 61 is provided with a shunt coil 70 which is arranged to be connected to the direct current circuit 2 through the contact members 65, 69 and 37, with a series coil 71 connected in the direct current circuit in parallel with an inductive shunt 72, with an auxiliary contact member 73 and with a reactor 74. The auxiliary contact member 73 in its left hand closed position completes a circuit from the direct current circuit 2 through the auxiliary contact member 69 of switch 5 and the auxiliary contact member 37 of switch 35 to the operating coil 75 of a switch provided with contact members 76 and 77. In the closed position of this switch, the contact member 76 forms a part of the direct current circuit 2 and the contact member 77 forms a part of a circuit through which the trip coil 46 of the switch 5 is energized when the over-current breaker 60 is closed and the reverse current breaker 61 is open. The breaker 61 thus performs somewhat the same function as the polarized relay 47 shown in Fig. 1 but, due to the inductive shunt 72, causes the circuit of the main switch trip coil 46 to be completed much quicker than the polarized relay if the increase in the value of the reverse current is very rapid.

The operation of the apparatus will be readily understood in view of the foregoing description. Assuming the switches 4 and 22 to be closed, the operation of the apparatus is initiated by closing the switch 21. Following closure of this switch, the switches 26, 28, 32 and 35 are successively closed thereby starting the generator 15 from which current is supplied to the operating coil 16 of the starting and exciting anode 13. The effect of this current is to operate the switch 17 to its upper closed position, thus interrupting the current of the coil 16, establishing the exciting arc and starting operation of the switch 42 which eventually connects the operating coil 43 of the main switch 5 to the bus 20. The direct current circuit may now be connected to the rectifier by closing the switches 60 and 61 in any suitable manner. As previously indicated, the establishment of the arc must be accomplished within a time predetermined by the adjustment of the timing element 40 of the switch 24 which would otherwise cause both the control apparatus and the exciting generator to be deenergized.

If the load of the rectifier decreases below a predetermined value, the movable member 50 of the polarized relay 47 is disengaged from the switch 51, the operating coil 54 of the switch 55 is connected to the bus 20, and the resistor 56 is connected in the exciting circuit in parallel with the operating coil 14 of the switch 17 thus increasing the exciting current and ensuring reliable operation of the rectifier at light load. If current starts through the circuit 2, in the reverse direction, due to arc back of the rectifier or the like, the trip coil 46 of the main switch 5 is connected to the bus 20, either through the switch 52 which is operated by the polarized relay 47 or through the auxiliary contact 73 which completes the operating circuit of the coil 46 when the reverse current breaker 61 is operated to its open position. Overload protection of the direct current circuit at the time it is connected to the rectifier is ensured by first closing the breaker 60 and thereafter closing the breaker 61. When the procedure is followed, closure of the switches 76 and 77 immediately follows closure of the switch 61 and the direct current circuit is immediately opened by the breaker 60 in case the current is excessive.

The embodiment of the invention illustrated and described herein has been selected for the purpose of clearly setting forth the principles involved. It will be apparent, however, that the invention is susceptible of being modified to meet the different conditions encountered in its use and I therefore aim to cover by the appended claims all modifications within the true spirit and scope of my invention.

What I claim as new and desire to secure by Letters Patent of the United States, is,—

1. The combination of a polyphase circuit, a mercury rectifier, and means operable to connect said rectifier to said circuit only when all the phases of said circuit are energized.

2. The combination of a polyphase alternating current circuit and a direct current circuit, a mercury rectifier arranged to be connected between said circuits, and means operable to complete the connection between said circuits through said rectifier only when all the phases of said alternating current circuit are energized.

3. The combination of a polyphase alternating current circuit, a direct current circuit, a mercury rectifier arranged to be connected between said circuits and provided with an exciting electrode, and means operable to establish an arc to said electrode and to connect said alternating current circuit to said rectifier only when all the phases of said alternating current circuit are energized.

4. The combination of a polyphase alternating current circuit, a direct current circuit, a mercury rectifier arranged to be connected between said circuits and provided with an exciting electrode, and means operable to establish an arc to said electrode only when all the phases of said alternating current circuit are energized.

5. The combination of a polyphase alternating current circuit, a direct current circuit, a mercury rectifier arranged to be connected between said circuits and provided with an exciting electrode, means operable successively to establish an arc to said electrode and to complete the connection between said circuits through said rectifier, and means operable to increase the current of said arc in response to a predetermined decrease in the load of said rectifier.

6. The combination of a plurality of circuits, a mercury rectifier provided with an exciting electrode, a switch arranged to complete a connection between said circuits through said rectifier, means operable successively to establish an arc to said electrode and to close said switch, and means operable to prevent closure of said switch if said arc is not established within a predetermined interval of time.

7. The combination of alternating and direct current circuits, a mercury rectifier provided with an exciting electrode, a switch arranged to interconnect said circuits through said rectifier, and means connected to said direct current circuit for causing the current of said electrode to be increased when the current of said direct current circuit decreases to a predetermined value and for causing said switch to be opened upon reversal of the current of said direct current circuit.

8. The combination of alternating an direct current circuits, a mercury rectifier provided with an exciting electrode, a switch arranged to interconnect said circuits through said rectifier, a polarized relay connected to said direct current circuit, and means controlled by said relay for causing the current of said electrode to be increased when the current of said direct current circuit decreases to a predetermined value and for causing said switch to be opened upon reversal of the current of said direct current circuit.

9. The combination of alternating and direct current circuits, a mercury rectifier, a switch arranged to interconnect said circuits through said rectifier, over-current and reverse-current circuit breakers connected in said direct current circuit, and means controlled by said circuit breakers for causing said switch to be opened when said reverse-current circuit breaker is operated to its open position.

10. The combination of alternating and direct current circuits, a mercury rectifier, a main switch arranged to interconnect said circuits through said rectifier, over-current and reverse-current circuit breakers connected in said direct current circuit, and a control switch operated to its closed position in response to closure of said reverse-current circuit breaker for completing the connection of said direct current circuit to said rectifier.

In witness whereof, I have hereunto set my hand this 15th day of October, 1926.

EUGENE L. HOUGH.